United States Patent [19]

Schasteen

[11] 4,202,109
[45] May 13, 1980

[54] THREAD GAUGE

[76] Inventor: Thomas C. Schasteen, 9305 205th Ave. East, Sumner, Wash. 98390

[21] Appl. No.: 871,241

[22] Filed: Jan. 23, 1978

Related U.S. Application Data

[63] Continuation of Ser. No. 589,043, Jun. 23, 1975, abandoned.

[51] Int. Cl.² .......................... G01B 3/38; G01B 3/40
[52] U.S. Cl. ................................. 33/199 R; 33/143 M
[58] Field of Search .............33/199 R, 143 M, 143 S, 33/143 K, 147 M

[56] References Cited

U.S. PATENT DOCUMENTS

| | | | |
|---|---|---|---|
| 2,246,066 | 7/1941 | Rothe | 33/143 M |
| 2,941,304 | 6/1960 | Man | 33/199 R |
| 3,491,452 | 1/1970 | Johnson | 33/199 R |

Primary Examiner—Willis Little
Attorney, Agent, or Firm—Don J. Flickinger

[57] ABSTRACT

An attachment is slidably engaged with the blade of a caliper-type measuring device. The attachment carries a contact element which is sized to be inserted into the groove between adjacent threads and abut each thread. The pitch diameter of threads are measured by opposed attachments carried by the respective blades of the calipers. Axial alignment of the contact member within the thread groove is accommodated by sliding arrangement between the attachment and the blade.

3 Claims, 9 Drawing Figures

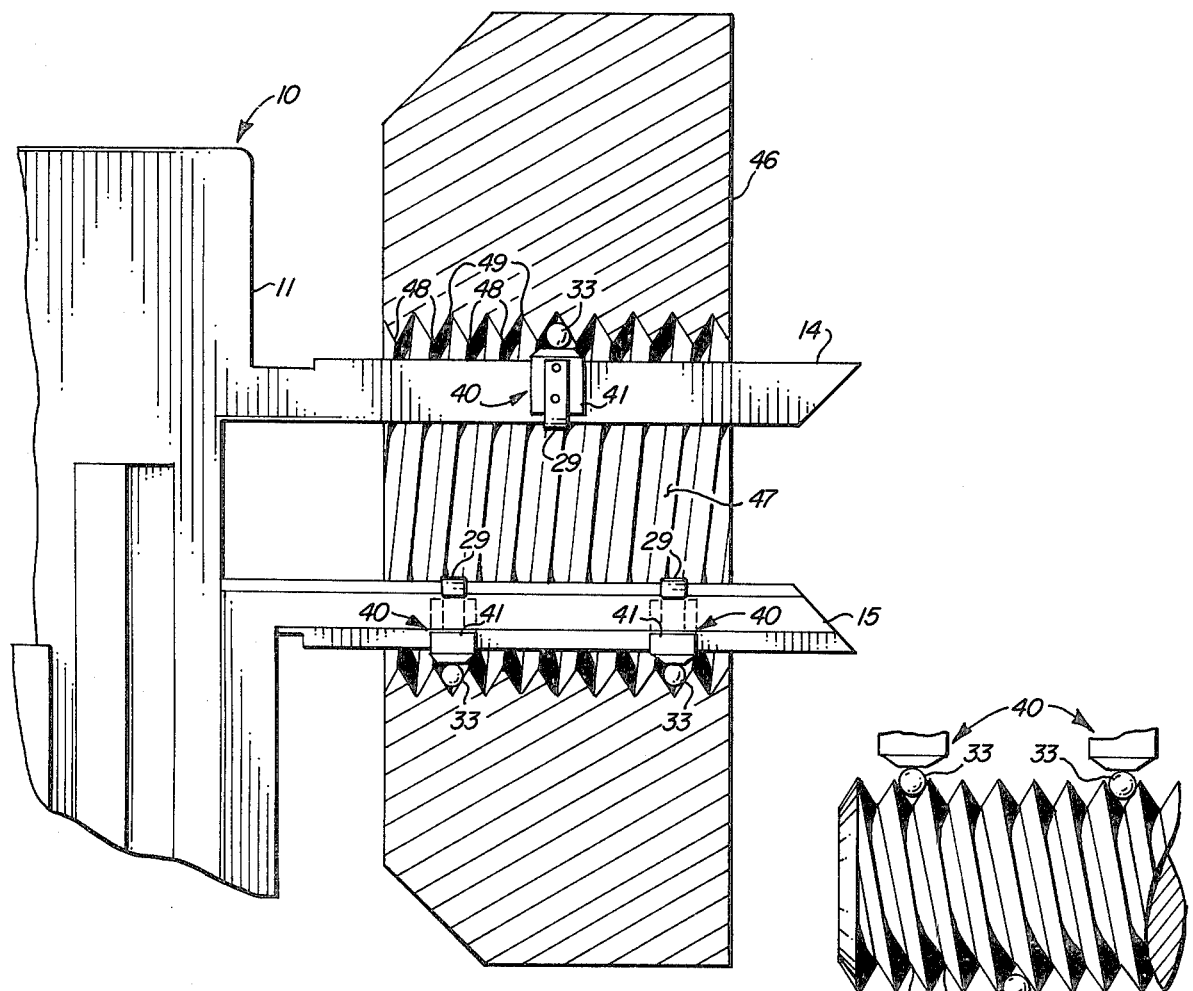
FIG. 6
FIG. 7
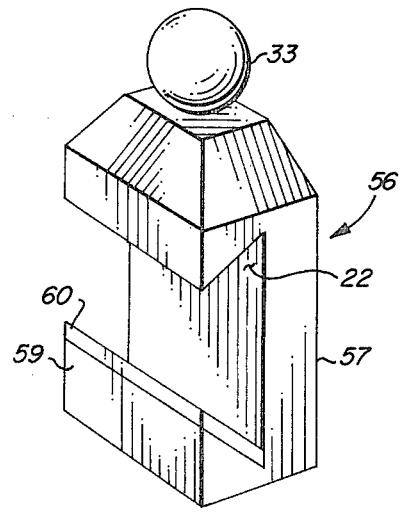
FIG. 8
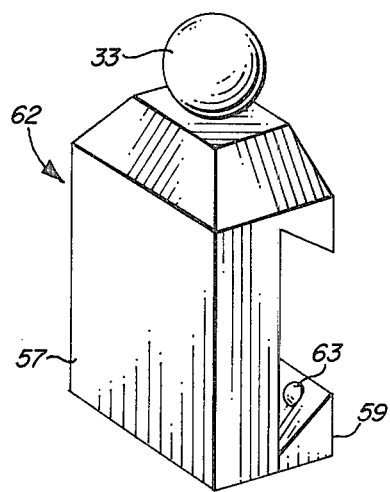
FIG. 9

THREAD GAUGE

This application is a continuation of the application of Thomas C. Schasteen, Ser. No. 589,043, filed June 23, 1975, now abandoned, for "Thread Gauge".

This invention generally relates to measuring instruments.

More particularly, the invention concerns a thread gauge for measuring the pitch diameter of threads.

In a further aspect the instant invention concerns a thread gauge which is readily attached to a caliper-type measuring instrument for determining the pitch diameter of internal and external threads.

A common operation generally associated with machine shop practice is thread forming. This involves various alternate operations such as rolling, cutting or grinding. Thread cutting is usually accomplished by taps, dies or a procedure known in the trade as "chasing" wherein the thread groove is cut by a single point tool as in a lathe operation.

Threads are measured and designated by pitch and pitch diameter. The measurements are of little immediate value when the threads are simply cut to a predetermined standard by fixed taps or dies. However, when a particular fit between mating threads is required or when custom thread shcemes are follows the measurements assume critical proportions.

It is relatively easy to machine a custom fit thread when the mating component is available for use as a gauge. This simply involves the process of "machine to fit" as is well understood in the machine trade. The procedure is substantially more complex when the mating component cannot be used as a gauge. For example, frequently threads are machined to a print dimension which must be maintained within a specified tolerance in order to fit a mating piece which for all practical purposes is not available. Also exemplary is the fabrication of a repair component for a machine which cannot be brought to the machine operator's work station. Various prior art devices have been proposed to simplify thread gauging in the foregoing examples. However, none have proven satisfactory and conventional machine shop practice proceeds according with rather antiquated, traditional methods.

Traditional methods generally specify that external threads are measured by a caliper over thread rolls or wires. Internal threads are machined to fit a go, no-go gauge. Therefore, the machine operator making a repair component having an internal thread which must mate with an external thread remote from his work station will first measure the remote external thread. With these dimensions the machine operator can produce a work piece having an identical threaded section thereon. Subsequently, the work piece is in turn used as a gauge for machining the internal thread. Making the gauge as an intermediate step is expensive and time consuming especially when considered that the gauge will be used once and have no further value.

It would be high advantageous, therefore, to provide improved means for thread gauging.

Accordingly, it is a principal object of the present invention to provide means for determining the pitch diameter of threads.

Another object of the present invention is to provide a thread gauge attachment for use in combination with caliper-type measuring devices.

Still another object of the invention is the provision of a thread gauge for measuring the pitch diameter of internal threads and external threads.

Yet another object of the instant invention is the provision of a thread gauge which is self-aligning with the pitch of the threads.

A further object of the invention is to provide a system of thread measurement to facilitate forming or cutting mating, threaded components.

And a further object of the invention is the provision of a thread gauging apparatus of the above type which is relatively inexpensive to manufacture, convenient to use and is devised in accordance with established standards of the art and trade to which it pertains.

Briefly, to achieve the desired objectives of the present invention in accordance with a preferred embodiment thereof, provided is a thread gauge attachment having a base member which is engageable with a blade of a caliper-type measuring instrument. The base is held in sliding engagement along the base by engagement means. A contact element carried by the base in insertable into a thread groove or concurrently abutting, adjacent threads.

In practice it is preferred that two thread gauge attachments are engaged with one blade of the caliper device while a single attachment is carried by the opposing blade. When the contact elements are positioned into opposed thread grooves by the blades, the pitch diameter is measured in accordance with standard practice of the art. The attachments are reversible upon the blades for measuring internal diameter threads and external diameter threads.

The foregoing and further and more specific objects and advantages of the present invention will become immediately apparent to those skilled in the art from the following detailed description thereof taken in conjunction with the drawings in which:

FIG. 6 is a vertical, sectional view of a work piece having an internal thread and specifically illustrating the use of the thread gauge attachment of the present invention for determining the pitch diameter of the threads;

FIG. 7 is a fragmentary, elevational view illustrating the use of the instant invention for gauging external threads;

FIG. 8 is a perspective view of another alternately preferred embodiment of the instant invention; and FIG. 9 is a perspective view of yet another alternately preferred embodiment of the instant invention.

Figure 1:
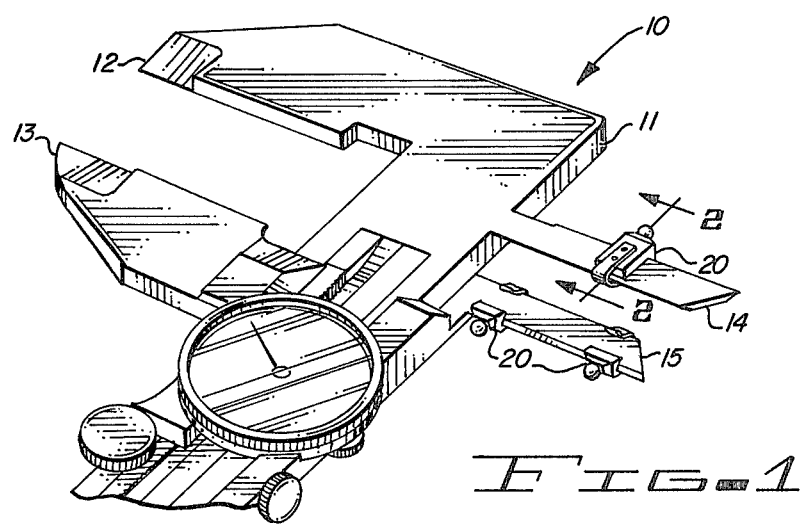
FIG. 1 is a partial, perspective view of a conventional caliper-type measuring instrument having the thread gauge attachment of the instant invention engaged therewith.

Turning now to the drawings in which the same reference numerals indicate corresponding elements throughout the several views, attention is first directed to FIG. 1 which shows a caliper-type measuring device generally designated by the reference character 10. Although various specific embodiments of caliper-type measuring instruments are commercially available, the caliper 10 herein illustrated is generally illustrative of all such devices. Caliper 10 includes frame 11 having fixed outside diameter measuring blade 12 extending therefrom. Movable outside dimension blade 13 is extendible and retractable along frame 11 in opposition to fixed blade 12. Similarly, frame 11 solidly supports fixed internal dimension measuring blade 14 and carries movable inside dimension blade 15. Although not herein specifically shown, caliper 10 may include a measurement indicating scale commonly of the vernier type or dial type. Still other calipers do not include a scale and are used simply for gauging the measurements being made by a separate measuring instrument. Similarly, it is conventional practice to provide calipers having only one pair of blades which are used for both internal and external measurements. A thread gauge attachment 20 constructed in accordance with the teachings of the present invention is engaged with fixed ID blade 14. Two thread gauge attachments 20 are carried by movable ID blade 15.

Figure 2:
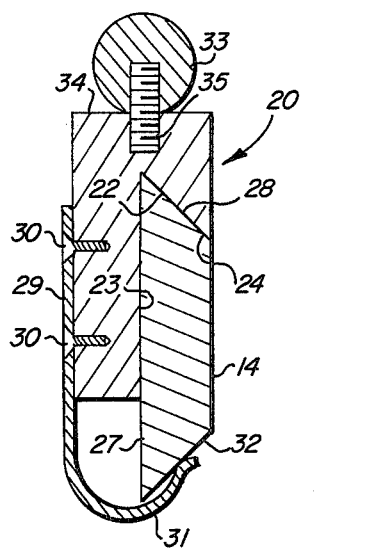
FIG. 2 is a vertical, sectional view taken along the line 2—2 of FIG. 1 and specifically illustrating the engagement between the blade of the caliper and the thread gauge attachment of the present invention.

As seen in FIG. 2 thread gauge attachment 20 includes base member 21 having longitudinal slot 22 therein. Slot 22 is triangular in cross-section to provide surfaces 23 and 24 which are in contact with backside 27 and bevelled edge 28, respectively, of blade 14. Spring clip 29 secured to base 21 by drive screws 30 extends downwardly therefrom and terminates with an upwardly arcuate section which bears against bevelled edge 32 of blade 14. A contact member in the form of ball 33 is secured to the upper surface 34 of base member 21 by threaded stud 35.

Figure 3:
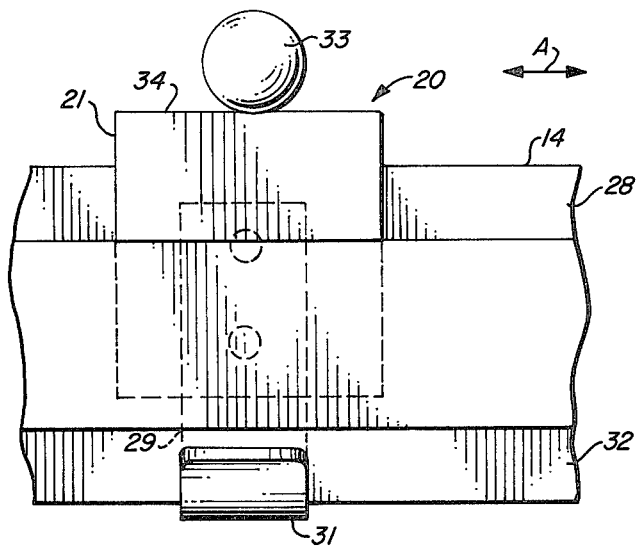
FIG. 3 is an enlarged, elevational view of the fragmentary section of the caliper blade of FIG. 1 having the thread gauge attachment engaged therewith.

In accordance with the foregoing arrangement thread gauge attachment 20 is held in firm engagement with blade 14 yet is readily slidable along blade 14 as indicated by the double headed arrow A as seen in FIG. 3. As illustrated in FIG. 1 attachments 20 are engaged with blades 14 and 15 to have contact members 33 extending outwardly therefrom. It will be immediately apparent to those skilled in the art, however, that attachments 20 are readily removed by sliding in the direction of the ends of the blades and are also re-engageable with the blades to have contact members 33 extending inwardly. The advantage gained, accordingly, will be described presently.

Figure 4:
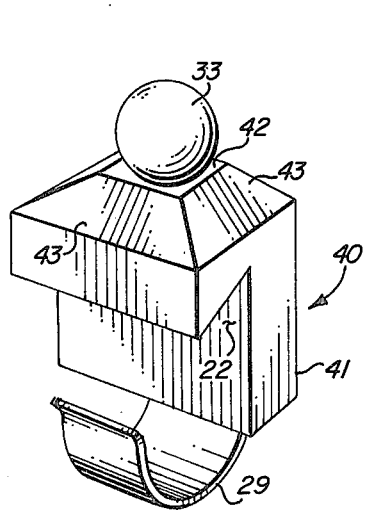
FIG. 4 is a frontal, perspective view of an alternately preferred embodiment of a thread gauge attachment constructed in accordance with the teachings of the present invention.
Figure 5:
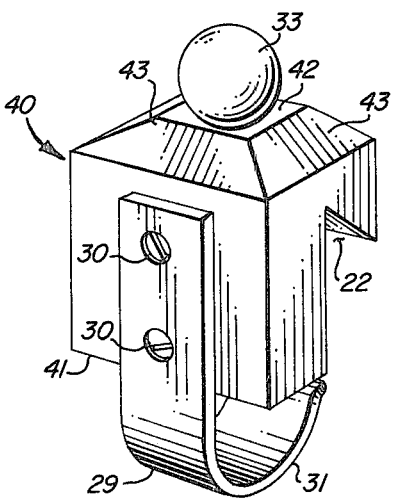
FIG. 5 is a rear perspective view of the device of FIG. 4.

FIGS. 4 and 5 depict an alternate thread gauge attachment generally designated by the reference character 40 which is an alternate embodiment of the attachment 20. Attachment 40 includes base 41 which similar to base 21 includes slot 22 and has spring clip 29 secured thereto. Contact member 33 is affixed to the upper surface 42 of base 41 as previously described. The primary difference between attachment 40 and attachment 20 is the bevelled edges 43 of upper surface 42 of base 41. Bevelled edges 43 are of particular utility for gauging internal diameter threads as will be hereinafter described. Referring specifically to FIG. 5 it is seen that drive screws 30 secure spring clip 29 to base 41. However, it will be immediately apparent to those skilled in the art that other fastening devices such as machine screws, rivets and spot welding are functionally equivalent.

FIG. 6 illustrates a work piece specifically shown as a nut 46 having a door 47 therethrough which is threaded. The internal threaded arrangement in bore 47 comprises a plurality of consecutive threads 48 having thread grooves 49 therebetween. In reality threads 48 and grooves 49 are a continuous spiral flight machined into the surface of bore 47. However, colloquially in accordance with conventional trade terminology threads and thread grooves are referred to as consecutive independent elements.

As seen in FIG. 6, a pair of thread gauge attachments 40 have been engaged with movable blade 15 and a single thread gauge attachment 40 engaged with fixed blade 14. Attachments 40, which are also generally representative of attachments 20, are oriented upon the blades to have contact members 33 extending outwardly. As blades 14 and 15 are moved apart in accordance with normal measurement technique, contacts 33 enter thread grooves 49 and abut adjacent threads 48. It is particularly noted that contacts 33 are self-aligning into grooves 49. That is, as contacts are moved in the radial direction, the abutment with one thread affects a camming movement causing base 40 to slide along the respective blade until contact 33 also abuts the concurrent thread. The three point measuring method assures axial alignment of blades 14 and 15 with bore 47 to provide an accurate diametric reading. The measuring method, especially the amount of pressure applied to blades 14 and 15, is accomplished in accordance with the "feel" technique which is commonly employed by those in the trade when using caliper-type measurement instruments.

FIG. 7 shows a cylindrical work piece 50 having an externally threaded portion defined by threads 51 and thread grooves 52. In contrast to the description of FIG. 6, thread gauge attachments 40 have been removed from their respective blades 14 and 15, reversed and re-engaged therewith such that contacts 33 extend inwardly. The pitch diameter of threads 51 is then measured as blades 14 and 15 are moved together.

It is readily seen that in view of the description associated with FIGS. 6 and 7 the thread gauge attachment of the instant invention provides the thread measuring system for machining a component which must mate with a component not immediately available. For example, cylindrical work piece 50 could be a threaded shaft associated with a remote piece of equipment. The measurement as taken in accordance with FIG. 7 is recorded and brought to the machine shop where nut 46 is fabricated. Since the width of blades 14 and 15 are known and the distance from the edge of either blade to contact 33 is a constant it is readily apparent that a table of values can be devised which can give a factor for the difference between the measurement of the internal threads and the external threads to provide equal pitch diameters. Tables of this general nature are well known and are based upon the number of threads per inch and the diameter of contact 33. Similarly, a table of values can be established for direct reading of the pitch diameter. While it is the intent of the instant invention to provide thread gauge attachments for use in connection with conventional commercially available caliper-type measuring instruments, it is within the scope of the invention to provide caliper-type measuring instruments which are graduated to have direct reading inside and outside pitch diameters.

FIG. 8 illustrates an alternate embodiment of a thread gauge attachment generally designated by the reference character 56 having base 57. Base 57 includes projection 59 which opposes groove 22. A gib 60 is carried by projection 59 to contact the bevelled edge of the blade which is opposite the bevelled edge upon which the surfaces of groove 22 rest. Although not herein specifically illustrated, giv 60 is pinned to prevent removal from projection 59. Spring biasing means, also not shown, but as will be immediately apparent to those skilled in the art interpose between gib 60 and projection 59 urge gib 60 against the bevelled edge of the blade for sliding retention of the attachment on the blade as previously described in connection with spring clip 29. A similar alternate embodiment 62 is provided with base 57 as shown in FIG. 9. Herein gib 60 is replaced by spring loaded ball detents 63 which are operationally analogous to the spring biased gib 60.

Various changes and modifications of the embodiments of the instant invention herein specifically chosen for purposes of illustration will readily occur to those skilled in the art. For example, contact member 33 has been illustrated and described as being spherical. Whereas, it is apparent that other shapes such as triangular forms are functionally equivalent. The spherical contact member is preferred, however, since a single size contact will accommodate the measurement of several thread sizes thereby materially reducing the number of different attachments required for a range of thread sizes. Other modifications are immediately apparent for affecting the sliding contact of the attachment element with the caliper blade.

Having fully described and disclosed the present invention and the preferred embodiments thereof in such clear and concise terms as to enable those skilled in the art to understand and practice the same, the invention claimed is:

1. In a thread gauging device for measuring the pitch diameter of helical threads and for self-alignment with the pitch of said threads:
   (a) a caliper including
      (i) a frame,
      (ii) a fixed blade element extending from said frame,
      (iii) a movable blade element carried by said frame and parallel to said fixed blade element and movable relative thereto while maintaining said parallel relation, and
      (iv) a scale for indicating the degree of separation between said blade elements;
   (b) a pair of thread gauge attachments carried by one of said blade elements in longitudinally spaced relation along that blade element;
   (c) a single thread gauge attachment carried by the other of said blade elements substantially at the middle of a longitudinal extent corresponding to the spacing of said thread gauges attached to the other of said blade elements;
   (d) a base element included in each thread gauge attachment and in sliding engagement with the blade element associated therewith;
   (e) each of said base elements being formed with a groove which slidably receives one of said blade elements;
   (f) spring means on each of said base elements cooperating with the blade on which that base element is mounted to maintain that base element in sliding relation to the blade element; and
   (g) a contact member carried by each of said base elements and receivable in thread grooves;
   (h) said base elements being reversably positionable on said blade elements such that a pair said contacts on one blade element and one of said contacts on the other blade element may alternatively face toward or away from each, the contact members of the pair of base elements on one thread gauge attachment being engaged with thread grooves in spaced relation with respect to the contact member in the other of said thread gauge attachments which is received in a thread groove between the thread grooves engaged by the pair of contact members on the other of said thread gauge attachments.

2. The thread gauge of claim 1 in which the spring means takes the form of a leaf spring.

3. The thread gauge of claim 1 in which each of said contact members is spherical.

* * * * *